W. LEECH.
DEVICE FOR THE PREVENTION OF ONANISM IN ANIMALS.
APPLICATION FILED MAY 16, 1908.
900,863.  Patented Oct. 13, 1908.
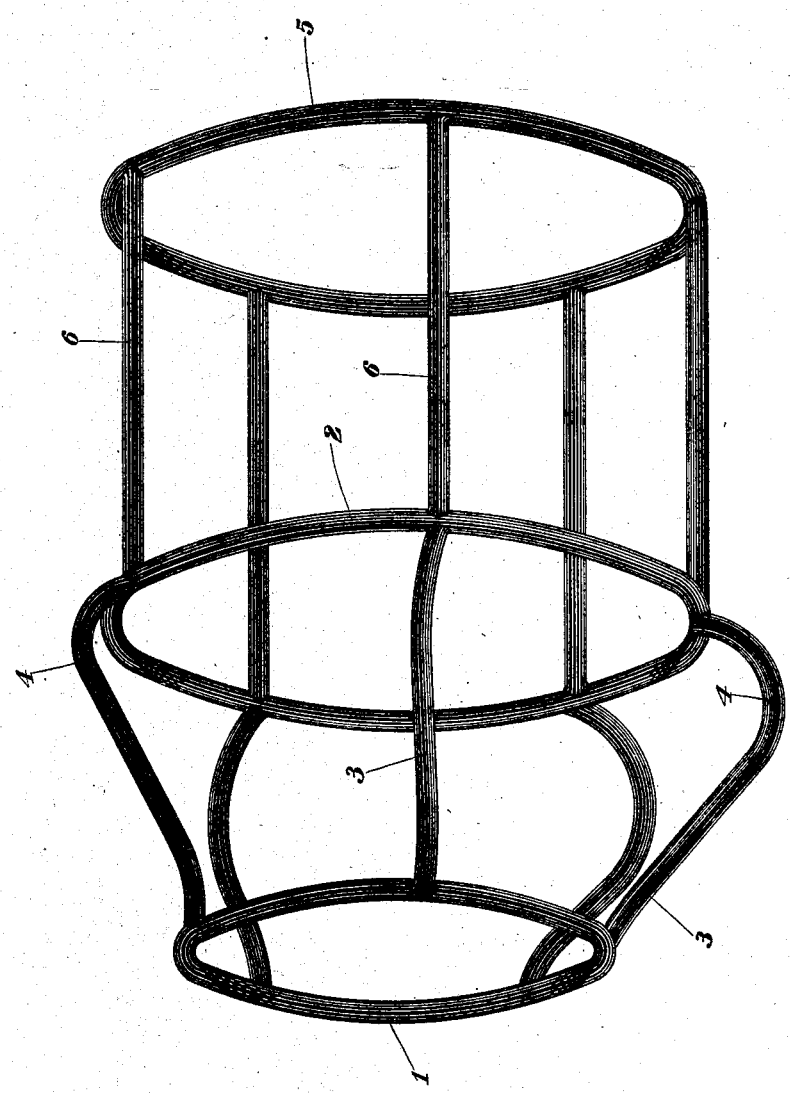
Witnesses
Frank H. Carter
J. B. Webster
Inventor
*William Leech*
By Percy S. Webster
Attorney

UNITED STATES PATENT OFFICE.

WILLIAM LEECH, OF MARYSVILLE, CALIFORNIA.

DEVICE FOR THE PREVENTION OF ONANISM IN ANIMALS.

No. 900,863.　　　　Specification of Letters Patent.　　　　Patented Oct. 13, 1908.

Application filed May 16, 1908. Serial No. 433,272.

*To all whom it may concern:*

Be it known that I, WILLIAM LEECH, a citizen of the United States, residing at Marysville, in the county of Yuba and State of California, have invented certain new and useful Improvements in Devices for the Prevention of the Practice of Onanism in Animals; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in certain devices for the prevention of the practice of onanism in animals and particularly in horses, my object being to produce a simple and inexpensive device which may be easily handled and installed and yet be extremely effective for the purpose for which it is designed. This object I accomplish mainly by means of a metal cage adapted to be fitted over the penis of the animal and prevent the abnormal erection thereof, all as shown and described in my Letters Patent No. 863,291, dated Aug. 13, 1907.

This present application relates to an improvement on the structure shown in the above patent, viz: to an addition to the cage, for preventing any possibility of displacement of the same, such addition consisting of an auxiliary retaining ring spaced apart from said shield but connected therewith by retaining wires, said auxiliary ring being so constructed and arranged for the purpose as will more fully appear by a perusal of the following specification and claim.

In the drawings similar characters of reference indicate corresponding parts throughout.

The figure of the drawings is a perspective view of the complete improved device, several times enlarged.

Referring more particularly to the characters of reference on the drawings 1 designates a lower small ring and 2 is a larger upper ring the same being spaced apart and joined by means of wires or bars 3, said wires being formed with outwardly curved projections 4, the ring 2 being in practice pressed over and normally fitting to the rear of the corona glandis or salient collar of the penis, the projections 4 rising over said corona glandis and being normally free therefrom thereby preventing pressing, pain, or irritation under normal conditions, the ring 1 fitting over the glans penis, whereby the whole forms a cage which incloses the head of the penis of the animal and causes pain when an erection takes place and not otherwise, thereby preventing any abnormal practices which are so injurious to the well being of the animal.

In order to better retain the cage on the penis of the animal, I have provided an auxiliary ring 5 spaced apart from the ring 2 but connected therewith by wires 6 said ring 5 encircling the penis at a higher point than the ring 2 thus aiding in retaining the cage in a normal position and preventing it from slipping forward, and at the same time aiding in the functions of the device by presenting a greater pressing means when the animal attempts to have an erection.

The particular improvement claimed in this device over the patent as above is the auxiliary ring 5 and its connecting wires 6, and while I have set forth herein in detail the present and preferred construction of the same, still in practice such deviations from such detail may be resorted to as do not form a departure from the spirit of the invention.

Having thus described my invention what I claim as new and useful and desire to secure by Letters Patent is:—

In a device of the character set forth, a small ring, a larger ring spaced therefrom, said rings being connected by a plurality of bars, and a third ring spaced from said larger ring, and connected therewith by a plurality of bars, as set forth.

In testimony whereof I affix my signature in presence of two witnesses.

WILLIAM LEECH.

Witnesses:
　RICHARD BELCHER,
　J. M. MORRISSEY.